Nov. 12, 1963  R. K. NEWKIRK  3,110,332
CENTRIFUGAL GRINDER

Filed Jan. 25, 1960  3 Sheets-Sheet 1

INVENTOR.
ROY K. NEWKIRK
BY
*Lyon & Lyon*
ATTORNEYS.

Nov. 12, 1963    R. K. NEWKIRK    3,110,332
CENTRIFUGAL GRINDER

Filed Jan. 25, 1960    3 Sheets-Sheet 2

TO DIGESTER

INVENTOR.
ROY K. NEWKIRK
BY
*Lyon & Lyon*
ATTORNEYS.

Nov. 12, 1963  R. K. NEWKIRK  3,110,332
CENTRIFUGAL GRINDER
Filed Jan. 25, 1960  3 Sheets-Sheet 3
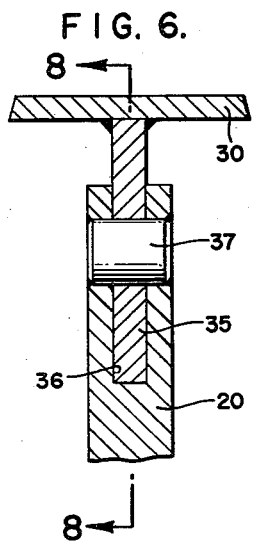
FIG. 6.
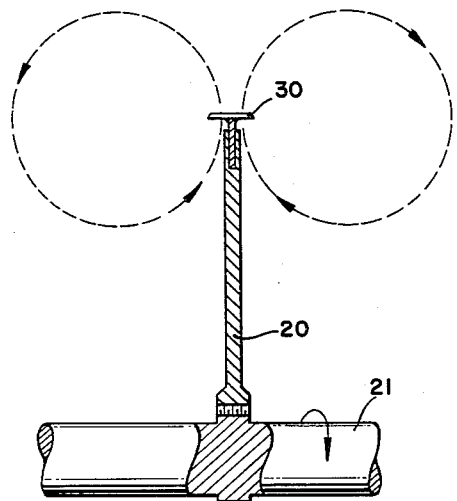
FIG. 5.
FIG. 7.
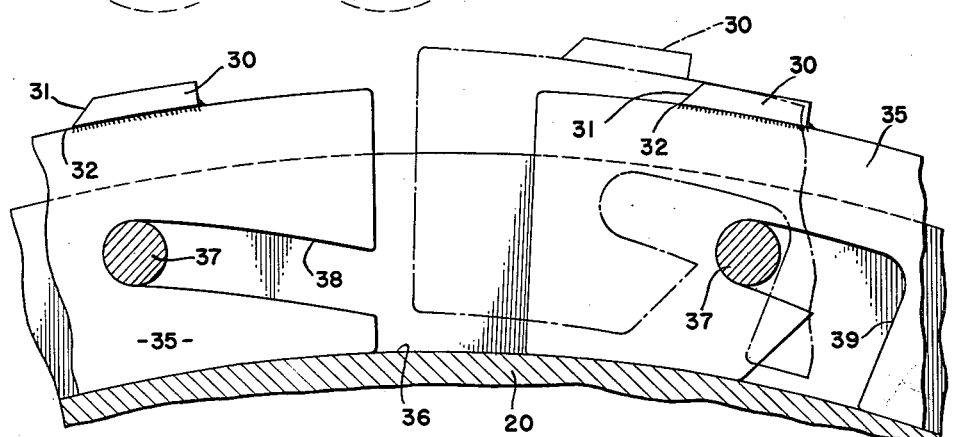
FIG. 8.
INVENTOR.
ROY K. NEWKIRK
BY
ATTORNEYS.

United States Patent Office 3,110,332
Patented Nov. 12, 1963

3,110,332
CENTRIFUGAL GRINDER
Roy K. Newkirk, 147 E. 216th St., Torrance, Calif.
Filed Jan. 25, 1960, Ser. No. 4,515
4 Claims. (Cl. 146—76)

This invention relates to grinding apparatus and has particular reference to an apparatus for the high-speed grinding of solid and semi-solid materials.

One of the principal objects of this invention is to provide a novel rotary grinding apparatus.

Another object of this invention is to provide a novel, high-capacity apparatus for comminuting whole fish, scrap fish meat and bones into a finished product of selected particle size.

Other objects and advantages of this invention, it is believed, will be readily apparent from the following detailed description of a preferred embodiment thereof when read in connection with the accompanying drawings, which is shown and described by way of illustration and not limitation.

In the drawings:

FIGURE 5 is a sectional view, on an enlarged scale, taken substantially on the line 5—5 of FIGURE 3.

FIGURE 6 is a sectional view on an enlarged scale, taken substantially on the line 6—6 of FIGURE 4.

FIGURE 7 is a perspective view of one of the grinder knives.

FIGURE 8 is a sectional view taken substantially on the line 8—8 of FIGURE 6.

Figure 1:
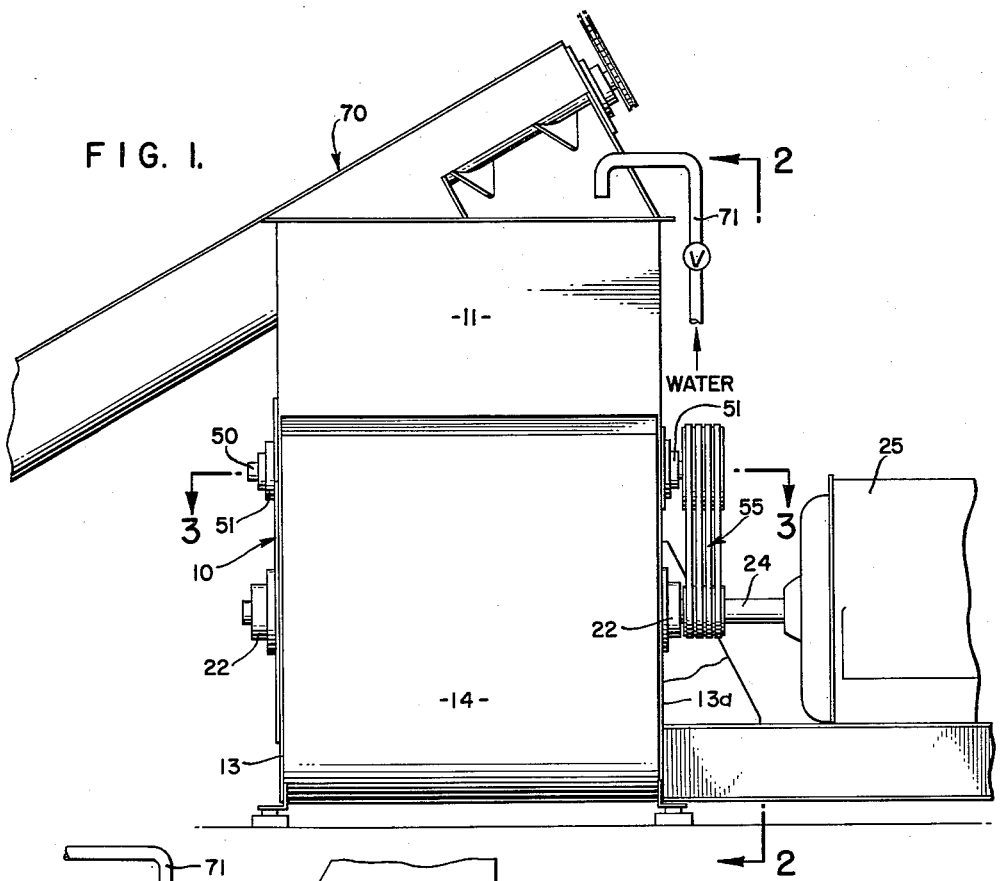
FIGURE 1 is a fragmentary side elevation of a preferred form of the apparatus of this invention.
Figure 2:
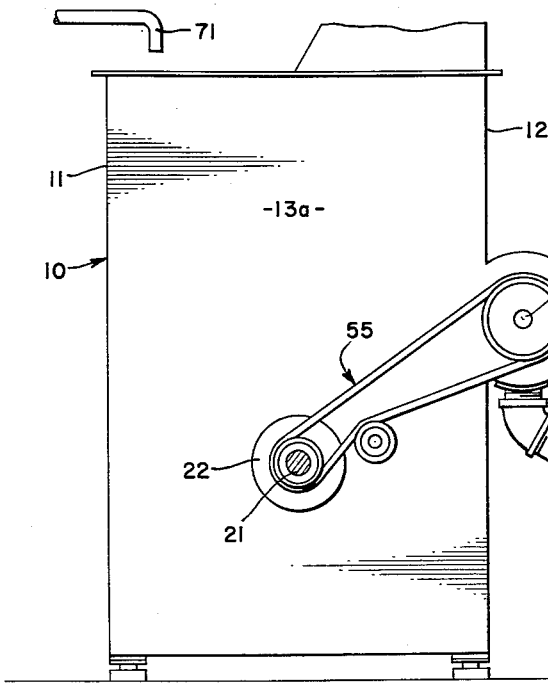
FIGURE 2 is a sectional view taken substantially on the line 2—2 of FIGURE 1.
Figure 3:
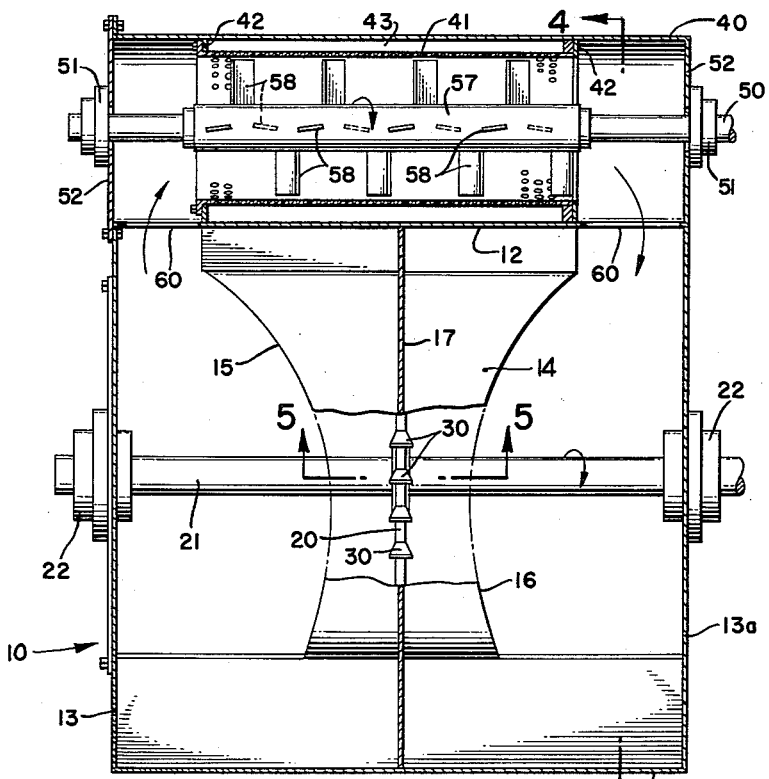
FIGURE 3 is a sectional view taken substantially on the line 3—3 of FIGURE 1.

Referring now to the drawings, the apparatus of this invention includes a housing or open-topped vessel 10 having side walls 11 and 12, and front and back walls 13 and 13a. The side walls 11 and 12 extend downwardly into contact with a cylinder or tank member 14 which forms the remainder of the sides and the bottom of the vessel. The upper portion of the cylinder is cut away along the lines 15 and 16 to provide a virtually open-topped cylinder. A partition 17 extends upwardly from the upper portion of the cylinder at the center thereof.

A vertical, rotary grinding wheel 20 is mounted centrally within the cylinder on a shaft 21 journalled in suitable bearings 22 provided in the front and rear walls 13 and 13a. The shaft 21 is operably connected to the drive shaft 24 of a motor 25.

The wheel 20 is a solid disk provided about the periphery thereof with a plurality of knives 30. The cutting edge of each knife is formed by a bevelled, hard-faced portion 31, the knife edges 32 extending outwardly from each side of the wheel and perpendicular to the plane of the wheel. The bevelled portion 31 of each knife forms an acute angle, preferably about 45°, with a radial line drawn to the cutting edge 32. Means are provided for quick and easy assembly and disassembly of the knives from the wheel for sharpening or for changing knife sizes. As shown in the drawings a plurality of segmental ring knife supports 35 are provided, each carrying a plurality of knives welded thereto. The knife supports are received in a circumferential groove 36 provided in the wheel and maintained therein by means of pins 37 which engage inclined slots 38 and bayonet-type slots 39 provided in each of the knife supports. Disassembly and assembly is easily accomplished as indicated by the phantom lines of FIGURE 8.

Secured to the housing 10 in communication with the interior thereof is an auxiliary housing 40, generally cylindrical in shape. Contained within the housing is a cylindrical screen 41, end walls 42 providing an annular outlet 43 for materials pressing through the screen. These materials are discharged through the outlet pipe 45. A shaft 50 extends through the housing 40, rotatably journalled in suitable bearings 51 in the end walls 52 of the housing and driven, through a suitable belt transmission 55, by the motor 25. Mounted on a shoulder 57 of the shaft are a plurality of agitator and conveyor paddles 58, the paddles being inclined at an angle from the axial and being staggered about the periphery of the shoulder 57.

The housing 40 communicates at each end with the interior of the cylinder 14 through the openings 60.

Figure 4:
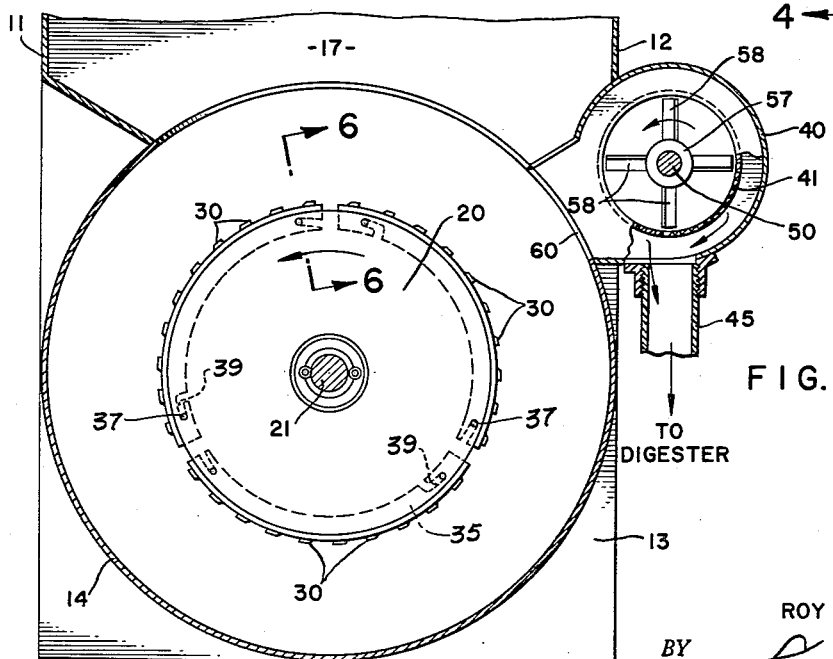
FIGURE 4 is a sectional view taken substantially on the line 4—4 of FIGURE 3.

In use of the apparatus, solid or semi-solid material to be ground is continuously fed into the housing 10 by means of the auger conveyor 70, a pipe 71 also being provided for the addition of water or other liquid to the material being ground. The material fills substantially the entire interior of the housing 10 and cylinder 14 and the grinder wheel operates at a speed of roughly 1100 r.p.m., rotating in the direction of the arrow of FIGURE 4. The centrifugal force developed by the wheel causes it to function in the manner of a pump, setting up toroidal flows or agitation of the material in the general directions of the arrows of FIGURE 5, forcing the material inwardly toward the center of the wheel and then radially outwardly along the wheel to be forceably contacted by the knives and to thereby be ground and disintegrated. Simultaneously with this action, a portion of the material is circulated through the classifying screen 41 by the paddles 58, the satisfactorily ground material passing through the screen and out the discharge 45. The oversize material is returned to the grinding wheel to be further reduced in size.

The apparatus of the present invention is particularly well adapted to the grinding of whole fish, scrap fish meat and bones to produce a slurry product of fine particle size. The apparatus can handle products such as whole sharks up to five feet in length. The capacity of the present apparatus is over 50 tons of solids per hour as against a maximum of 12 tons an hour for conventional machines in use in the industry. In grinding fish materials it is preferred to add some water to the material fed into the housing. As an example, about 360 gallons of water per ton of fish scraps consisting of tuna, sardine and makeral wastes from canning operations have been used.

Having fully described my invention, it is to be understood that I do not wish to be limited to the details set forth, but my invention is of the full scope of the appended claims.

I claim:

1. A grinding apparatus comprising the combination of a cylindrical housing, a grinding wheel mounted in said housing for high speed rotation in a vertical plane, said grinding wheel comprising a disk having a plurality of knives mounted on the periphery thereof, each of said knives having a cutting edge extending generally perpendicular to the plane of said wheel, the cutting edges of said knives being closely adjacent to said periphery, and extending outwardly from each side of the disk, means for continuously feeding material to said housing, means for continuously screening the ground material, means for continuously withdrawing screen material from said housing, and means for rotating said grinding wheel.

2. The apparatus of claim 1 wherein the cutting edge is defined by a bevelled surface lying in a plane defining an acute angle with a radial line drawn from the center of said wheel to the cutting edge.

3. The apparatus of claim 1 wherein the knives are removably mounted in said disc, said disc being provided with a circumferential groove, a plurality of knife supports, each carrying a plurality of said knives, said knife supports etxending into said groove, and bayonet-lock means releasably securing said supports to said disc.

4. The apparatus of claim 1 wherein the means for screening the material includes a cylindrical screen, a shaft extending axially through said screen, and a plurality of paddles mounted at an angle on said shaft for forcing particles through said screen and for conveying oversize particles longitudinally with respect to said screen.

References Cited in the file of this patent

UNITED STATES PATENTS

| | | |
|---|---|---|
| Re. 14,926 | Plaisted | July 27, 1920 |
| 449,585 | Jull | Mar. 31, 1891 |
| 646,284 | Hilton | Mar. 27, 1900 |
| 938,734 | Williams et al. | Nov. 2, 1909 |
| 1,726,874 | Werner | Sept. 3, 1929 |
| 2,066,621 | Gray | Jan. 5, 1937 |
| 2,285,315 | Thompson | June 2, 1942 |
| 2,327,280 | McCashen | Aug. 17, 1943 |

FOREIGN PATENTS

| | | |
|---|---|---|
| 55,190 | France | Apr. 15, 1951 |
| | (Addition to No. 923,924) | |